United States Patent
Yen et al.

(10) Patent No.: US 8,253,877 B2
(45) Date of Patent: Aug. 28, 2012

(54) LIQUID CRYSTAL DISPLAY

(75) Inventors: Tung-I Yen, Hsin-Chu (TW);
Chung-Jung Chen, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 787 days.

(21) Appl. No.: 12/352,764

(22) Filed: Jan. 13, 2009

(65) Prior Publication Data

US 2010/0085502 A1    Apr. 8, 2010

(30) Foreign Application Priority Data

Oct. 6, 2008   (TW) ............................... 97138469 A (51) Int. Cl.
*G02F 1/13357*    (2006.01)
(52) U.S. Cl. .............................. 349/58; 349/65; 362/612
(58) Field of Classification Search .................... 349/58, 349/61, 65; 362/611, 612, 615, 632, 633, 362/634, 97.2, 97.3
See application file for complete search history.

(56) References Cited

U.S. PATENT DOCUMENTS

| | | | | |
|---|---|---|---|---|
| 2006/0256583 | A1* | 11/2006 | Shimizu et al. | 362/633 |
| 2007/0165424 | A1* | 7/2007 | Sakai | 362/633 |
| 2008/0204623 | A1* | 8/2008 | Tanaka | 349/58 |
| 2009/0040430 | A1* | 2/2009 | Tang | 349/65 |

FOREIGN PATENT DOCUMENTS

| | | |
|---|---|---|
| CN | 1815322 | 8/2006 |
| TW | 594248 | 10/2004 |

* cited by examiner

*Primary Examiner* — Dung Nguyen
*Assistant Examiner* — Tai Duong
(74) *Attorney, Agent, or Firm* — Chun-Ming Shih (57) ABSTRACT

A liquid crystal display (LCD) includes a back bezel, a light guide plate (LGP) having a light incident surface opposite to a first side wall of the back bezel, an LCD panel disposed above the LGP, a frame and a light source unit. There is an accommodation space between the first side wall of the back bezel and the light incident surface of the LGP. The frame is assembled with the back bezel to fix and surround the LGP and the LCD panel. A portion of the frame extends across the upper side of the accommodation space. A portion of the second side wall of the frame is opposite to the entrance side of the accommodation space and has a first securing portion. The light source unit has a second securing portion. When the light source unit is mounted/attached into the accommodation space, the second securing portion is jointed the first securing portion to secure the light source unit.

24 Claims, 6 Drawing Sheets

LIQUID CRYSTAL DISPLAY

CROSS-REFERENCE TO RELATED APPLICATIONS

This application is based upon and claims the benefit of priority from the prior Taiwanese Patent Application No. 097138469, filed Oct. 6, 2008, the entire contents of which are incorporated herein by reference.

BACKGROUND

1. Field of the Invention

The present invention relates to a display, and more particularly to a liquid crystal display.

2. Description of the Related Art

With the development of flat panel display technique, flat panel displays (FPDs) that have advantages of light in weight, small in size and low power consumption are becoming more and more popular. Typically, the flat panel displays include liquid crystal displays (LCDs), plasma panel displays (PDPs), organic light emitting diode displays (OLED displays) and electrophoretic displays (EPDs). Among the flat panel displays, the liquid crystal displays are most widely used.

The liquid crystal display includes a liquid crystal display panel and a backlight module, wherein the backlight module is for providing a plane light source to the liquid crystal display panel. The quality of the liquid crystal display is closely dependent on the quality of the plane light source provided by the backlight module.

Figure 1:
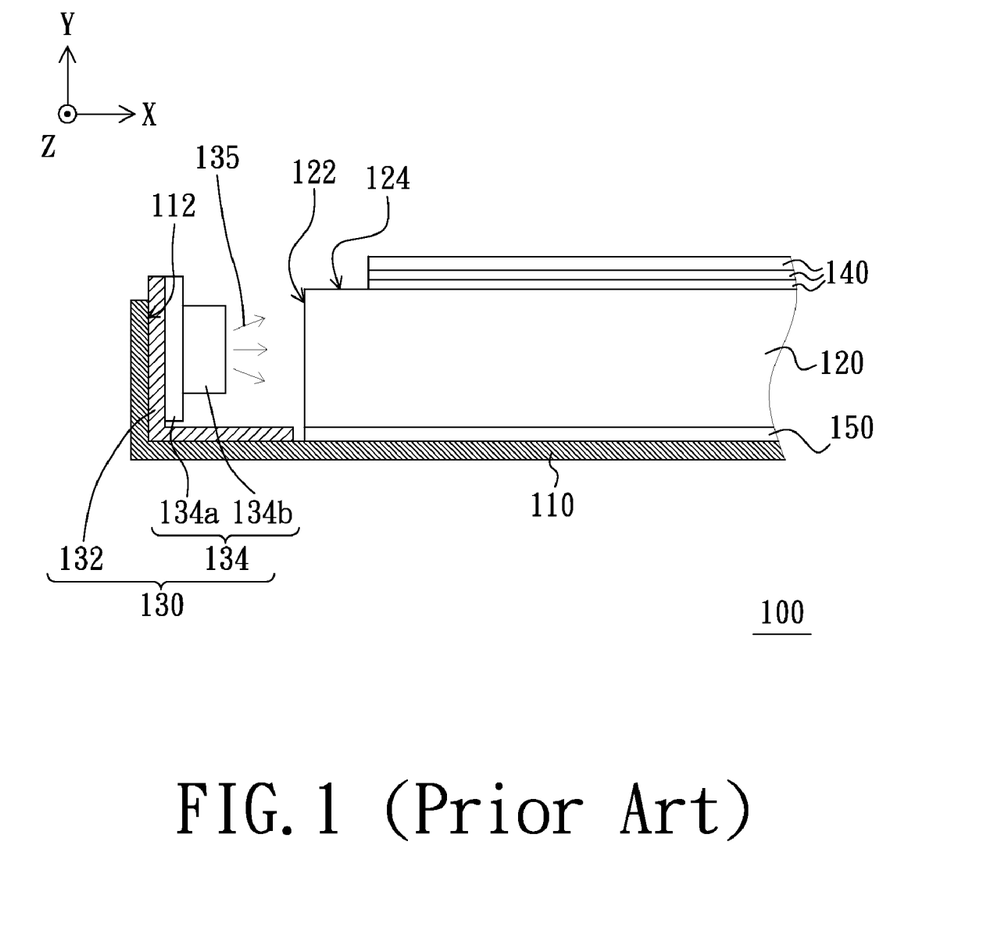
FIG. 1 is a schematic view of a conventional backlight module.

FIG. 1 is a schematic view of a conventional backlight module. Referring to FIG. 1, the conventional backlight module 100 includes a back bezel 110, a light guide plate 120, a light source unit 130, a plurality of optical sheets 140 and a reflective sheet 150. The light guide plate 120 is disposed on the back bezel 110, and the reflective sheet 150 is disposed between the light guide plate 120 and the back bezel 110. The light guide plate 120 has a light incident surface 122 and a light emitting surface 124, and the optical sheets 140 are disposed on the light emitting surface 124.

The light source unit 130 includes a lamp holder 132 and a light source set 134 fixed at the lamp holder 132. The light source set 134 includes a stripe substrate 134a and a plurality of light emitting diodes 134b disposed on the stripe substrate 134a. The light emitting diodes 134b are top emission type light emitting diodes and are for providing light rays 135 to the light guide plate 120. The light guide plate 120 receives the light rays 135 from the light incident surface 122 and converts the light rays 135 into a plane light source. The reflective sheet 150 is for reflecting the light rays 135 to emit toward the light emitting surface 124 of the light guide plate 120, and then the light rays 135 transmit to a liquid crystal display through the optical sheets 140. The optical sheets 140 uniform the plane light source.

In the conventional technique, when the light source unit 130 is failed and needs to be replaced, the backlight module 100 needs to be completely disassembled. Therefore, it is inconvenient to repair the conventional backlight module 100.

BRIEF SUMMARY

The present invention relates to a liquid crystal display whose light source unit is easily to be replaced.

The present invention further relates to a liquid crystal display for improving light emitting efficiency of a light source unit of the liquid crystal display.

To achieve the above-mentioned advantages, a liquid crystal display is provided. The liquid crystal display includes a back bezel, a light guide plate, a liquid crystal display panel, a frame and a light source unit. The light guide plate is disposed on a bottom of the back bezel. The light guide plate has a light incident surface opposite to a first side wall of the back bezel and spaced at a distance from the first side wall of the back bezel. There is an accommodation space between the first side wall of the back bezel and the light incident surface of the light guide plate, and the accommodation space has an entrance side and an upper side opposite to the bottom of the back bezel. The liquid crystal display panel is disposed above a light emitting surface of the light guide plate. The frame is assembled with the back bezel to fix and surround the light guide plate and the liquid crystal display panel. A portion of the frame extends across the upper side of the accommodation space, and a second side wall of the frame is opposite to the entrance side and has a first securing portion. The light source unit is adapted to be mounted/attached into the accommodation space along the predetermined direction from the entrance side, and the light source unit has a second securing portion. When the light source unit is mounted into the accommodation space, the second securing portion is jointed the first securing portion and the light source unit is adjacent to the light guide plate.

In an embodiment of the present invention, the first securing portion comprises a securing recess, and the second securing portion comprises a securing pin. When the light source unit is mounted/attached into the accommodation space, the second securing portion is wedged with the first securing portion.

In an embodiment of the present invention, the first securing portion further comprises a guiding portion adjoining an opening of the securing recess.

In an embodiment of the present invention, the light source unit includes a lamp holder and a light source set. The lamp holder has a plate with the second securing portion and the light source set is disposed at the plate of the lamp holder. The lamp holder further has a first extending part which connects to the plate of the lamp holder. When the light source unit is mounted/attached into the accommodation space, the first extending part is partially beneath the light guide plate.

In an embodiment of the present invention, the light source set includes a strip substrate and a plurality of point light sources. The strip substrate is disposed at the lamp holder and the point light sources are disposed at the strip substrate.

In an embodiment of the present invention, the point light sources are light emitting diodes.

In an embodiment of the present invention, the bottom of the back bezel has a protrusion unit arranged in the predetermined direction, and the protrusion unit is located in the accommodation space. When the light source unit is mounted/attached into the accommodation space, the protrusion unit supports the lamp holder.

In an embodiment of the present invention, the protrusion unit comprises a plurality of protrusion strips arranged in the predetermined direction.

In an embodiment of the present invention, the protrusion unit comprises a plurality of protrusion bumps arranged in the predetermined direction.

To achieve the above-mentioned advantages, another liquid crystal display is further provided. The liquid crystal display includes a back bezel, a light guide plate, a liquid crystal display panel, a frame and a light source unit. A bottom of the back bezel has a protrusion unit arranged in a predetermined direction. The light guide plate is disposed on the bottom of the back bezel. The light guide plate has a light incident surface opposite to a first side wall of the back bezel and spaced at a distance from the first side wall of the back bezel. There is an accommodation space between the first side wall of the back bezel and light incident surface of the light guide plate, and the protrusion unit is located in the accommodation space. The liquid crystal display panel is disposed above a light emitting surface of the light guide plate. The frame is assembled with the back bezel to fix and surround the light guide plate and the liquid crystal display panel. A portion of the frame extends across the accommodation space. The light source unit is located in the accommodation space. When the light source unit is mounted/attached into accommodation space along the predetermined direction, the protrusion unit supports the light source unit.

In an embodiment of the present invention, the light source unit includes a lamp holder and a light source set, wherein the light source set is disposed at the lamp holder. When the light source unit is mounted/attached into the accommodation space, the protrusion unit supports the lamp holder.

In an embodiment of the present invention, the protrusion unit comprises a plurality of protrusion strips arranged in the predetermined direction.

In an embodiment of the present invention, the protrusion unit comprises a plurality of protrusion bumps arranged in the predetermined direction.

In the liquid crystal display of the present invention, due to the light source unit being detachable, when the light source unit is failed, only the light source unit needs to be detached for replacing a new one. Therefore, the liquid crystal display of the present invention can improve repair efficiency of the light source unit. Furthermore, in the liquid crystal display of the present invention, the light source unit can be fixed at a suitable position, so light incident efficiency of the light guide plate can be improved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 2:
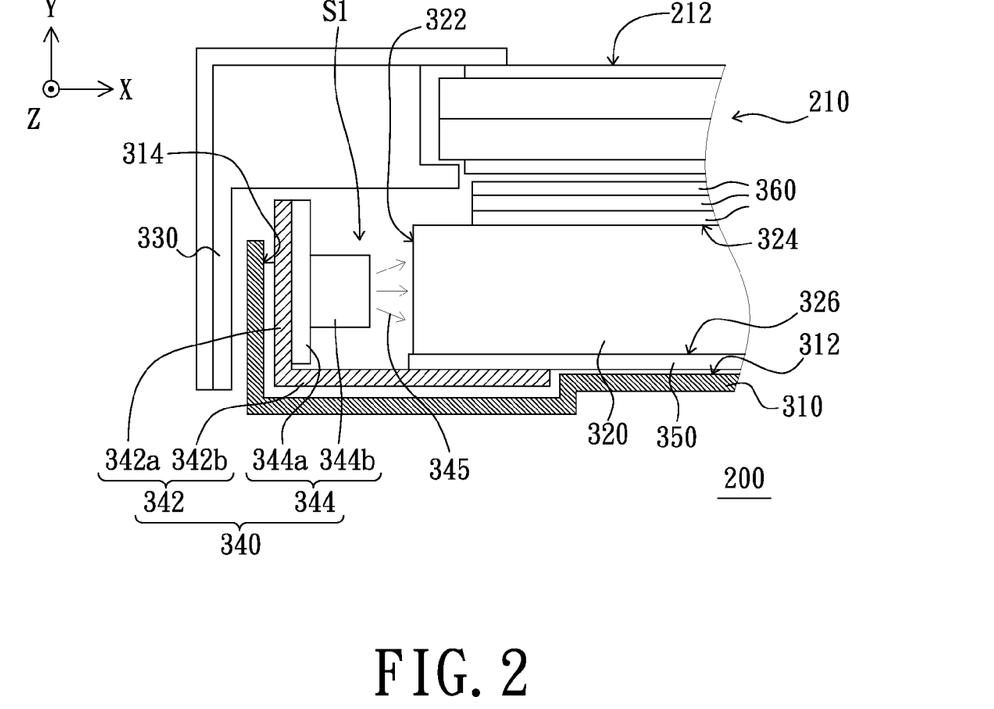
FIG. 2 is a schematic view of a liquid crystal display according to an embodiment of the present invention.
Figure 3A:
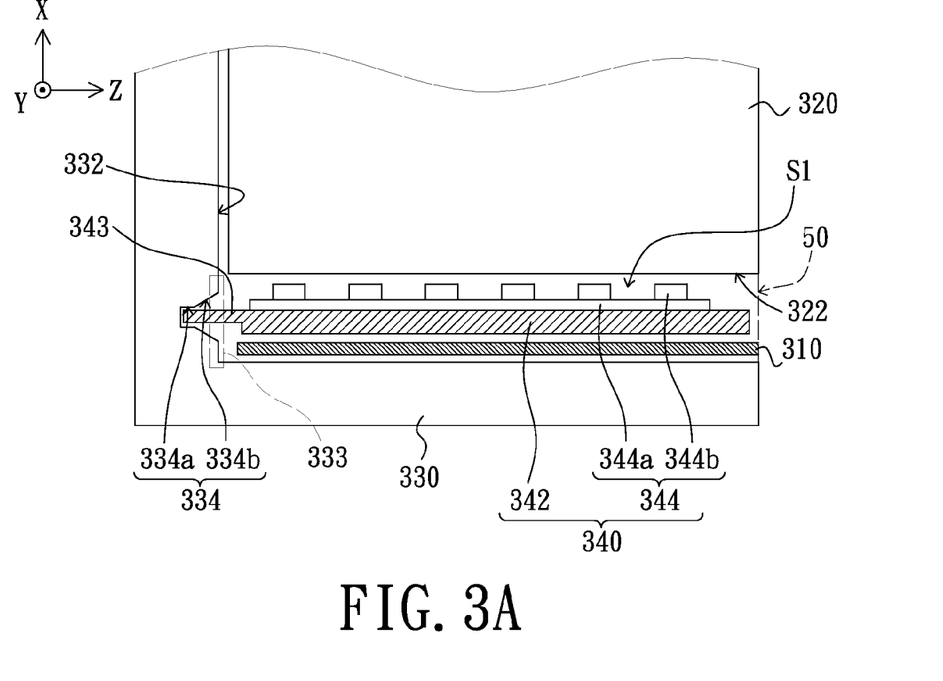
FIG. 3A is a schematic top view of a light guide plate, a frame, a first side wall of a back bezel and a light source unit of FIG. 2.
Figure 3B:
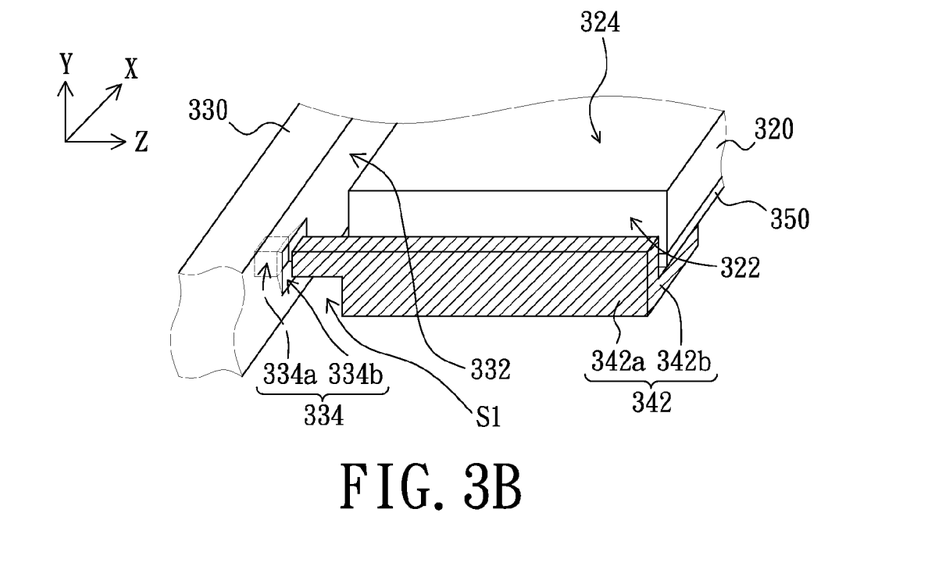
FIG. 3B is a schematic three-dimensional view showing the light source unit of FIG. 2 being mounted into an accommodation space along a predetermined direction.

FIG. 2 is a schematic view of a liquid crystal display according to an embodiment of the present invention, FIG. 3A is a schematic top view of a light guide plate, a frame, a first side wall of a back bezel and a light source unit of FIG. 2, and FIG. 3B is a schematic three-dimensional view showing the light source unit of FIG. 2 being mounted into an accommodation space along a predetermined direction. Referring to FIGS. 2, 3A and 3B, the liquid crystal display 200 of the present embodiment includes a liquid crystal display panel 210, a back bezel 310, a light guide plate 320, a frame 330 and a light source unit 340. The light guide plate 320 is disposed on a bottom 312 of the back bezel 310. The light guide plate 320 has a light incident surface 322 opposite to a first side wall 314 of the back bezel 310 and spaced at a distance from a first side wall 314 of the back bezel 310. There is an accommodation space S1 between the first side wall 314 of the back bezel 310 and the light incident surface 322 of the light guide plate 320, and the accommodation space S1 has an entrance side 50 and an upper side (un-shown in the figures) opposite to the bottom 312 of the back bezel 310. The liquid crystal display panel 210 is disposed above a light emitting surface 324 of the light guide plate 320. The frame 330 is assembled with the back bezel 310 to fix and surround the light guide plate 320 and the liquid crystal display panel 210, and the frame 330 exposes a display area 212 of the liquid crystal display panel 210. A portion of the frame 330 extends across the upper side of the accommodation space S1 to contact the liquid crystal display panel 210. Furthermore, the light source unit 340 is detachable and attachable. The light source unit 340 is mounted or attached into the accommodation space S1 along a predetermined direction (e.g. a Z axis as shown in FIGS. 3A and 3B) from the entrance side 50.

The material of the back bezel 310 can be metal to provide a heat dissipation function. The light source unit 340 includes a lamp holder 342 and a light source set 344, and the light source set 344 is disposed at the lamp holder 342. The lamp holder 342 has a plate 342a and a first extending part 342b which connects to the plate 342a. Furthermore, the first extending part 342b may be preferably perpendicular to the plate 342a. The light source set 344 is disposed at or fixed to the plate 342a of the lamp holder 342. The light source set 344 includes a strip substrate 344a and a plurality of point light sources 344b. The strip substrate 344a is disposed at or fixed to the plate 342a of the lamp holder 342 and the point light sources 344b are disposed at the strip substrate 344a. The point light sources 344b can be light emitting diodes for providing light rays 345 to the light guide plate 320. The light guide plate 320 receives the light rays 345 from the light incident surface 322 and converts the light rays 345 into a plane light source, and then the plane light source emits from the light emitting surface 324 of the light guide plate 320. Furthermore, the liquid crystal display 200 can further include a reflective sheet 350 and a plurality of optical sheets 360. The reflective sheet 350 is disposed between the light guide plate 320 and the back bezel 310 to reflect a portion of light rays 345 emitting from a bottom surface 326 of the light guide plate 320 back to the light guide plate 320. The optical sheets 360 is disposed above the light emitting surface 324 of the light guide plate 320 to further uniform the plane light source. The optical sheets 360 can be selected from a group consisting of a diffusion sheet, a prism sheet and a brightness enhancement sheet.

In the present embodiment, a portion 333 of the second side wall 332 of the frame 330 is opposite to the entrance side 50 and has a first securing portion 334, and the light source unit 340 including the lamp holder 342 has a second securing portion 343. The second securing portion 343 is located at the side of the lamp holder 342 and also at the side of the plate 342a. The lamp holder 342 and the second securing portion 343 are also named as the lamp detachable device. When the light source unit 340 is mounted or slid into the accommodation space S1 along the predetermined direction, the second securing portion 343 is jointed with the first securing portion 334. More specifically, the first securing portion 334 includes, for example, a securing recess 334a and the second securing portion 343 can be a securing pin of the lamp holder 342 or the plate 342a. When the light source unit 340 is mounted or attached into the accommodation space S1 along the predetermined direction, the second securing portion 343 is wedged with the securing recess 334a of the first securing portion 334. In addition, the first extending part 342b is partially beneath the light guide plate 320.

Employing the second securing portion 343 to be wedged with the securing recess 334a of the first securing portion 334 enables the point light sources 344b to approach the light incident surface 322 of the light guide plate 320. This can improve light incident efficiency of the light guide plate 320 and maintain a suitable interval between the point light sources 344b and the light incident surface 322 of the light guide plate 320 to prevent light scattering caused by a lager interval between the point light sources 344b and the light incident surface 322 of the light guide plate 320. Therefore, light coupling efficiency of the liquid crystal display 300 is improved. Moreover, the first securing portion 334 can further include a guiding portion 334b adjoining an opening of the securing recess 334a. When the light source unit 340 is mounted or attached into the accommodation space S1, the guiding portion 334b can guide the second securing portion 343 to the securing recess 334a. Therefore, the second securing portion 343 is easily to be wedged with the securing recess 334a, and thus assembling efficiency is improved.

It should be noted that, in another embodiment, the first securing portion 334 can be the securing pin and the second securing portion 343 can be the securing recess. Further, although the above-mentioned embodiments take the securing pin and the securing recess as an example, the present invention does not limit the joining manner of the first securing portion 334 and the second securing portion 343.

Figure 4:
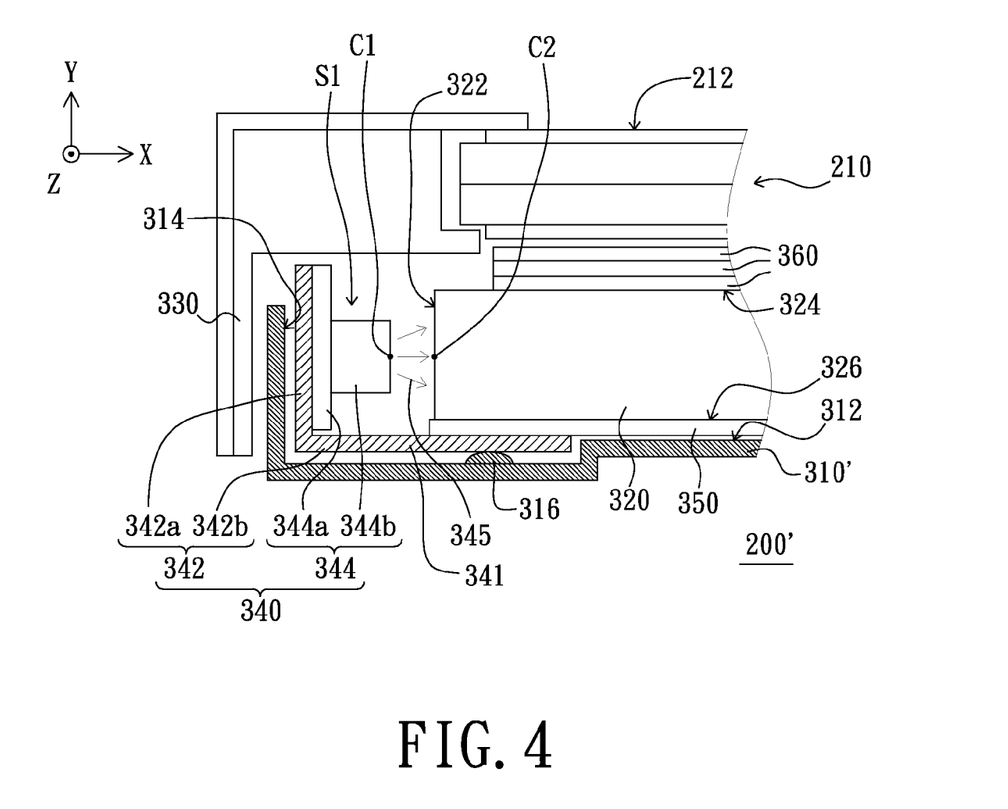
FIG. 4 is a schematic view of a liquid crystal display according to another embodiment of the present invention.
Figure 5:
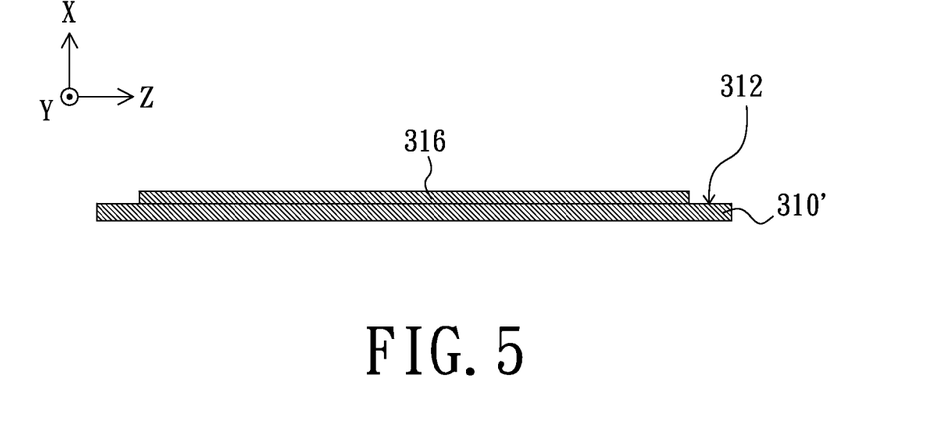
FIG. 5 is a schematic cross-section view of a back bezel of FIG. 4.

FIG. 4 is a schematic view of a liquid crystal display according to another embodiment of the present invention, and FIG. 5 is a schematic cross-section view of a back bezel of FIG. 4. Referring to FIGS. 4 and 5, the liquid crystal display 200' is similar to the liquid crystal display 200 of FIG. 2, and only the difference will be described below. Comparing to the liquid crystal display 200, the bottom 312 of the back bezel 310' of the liquid crystal display 200' has a protrusion unit 316 arranged in the predetermined direction (e.g. the Z axis as shown in FIG. 4 and 5), and the protrusion unit 316 is located in the accommodation space S1. When the light source unit 340 is mounted or attached into the accommodation space S1, the protrusion unit 316 supports the light source unit 340. More specifically, in the present embodiment, when the light source unit 340 is mounted or attached into the accommodation space S1, the protrusion unit 316 supports the first extending part 342b of the lamp holder 342 for the light source unit 340. Further, the protrusion unit 316 and the back bezel 310' can be integrated into one piece.

In the present embodiment, the protrusion unit 316 is used to support the light source unit 340 , so this can keep each of the point light sources 344b in a proper height. More specifically, a central point C1 of a light emitting surface for each of the point light sources 344b can face a central line C2 of the light incident surface 322 for the light guide plate 320, wherein the central line C2 extends along the Z axis. Thus, display quality of the liquid crystal display 200' can be improved. Furthermore, while the light source unit 340 being mounted or attached into or detached from the accommodation space S1, friction between the protrusion unit 316 and the lamp holder 342 of the light source unit 340 is smaller, so the light source unit 340 can be easily mounted or attached into or detached from the accommodation space S1.

Figure 6:
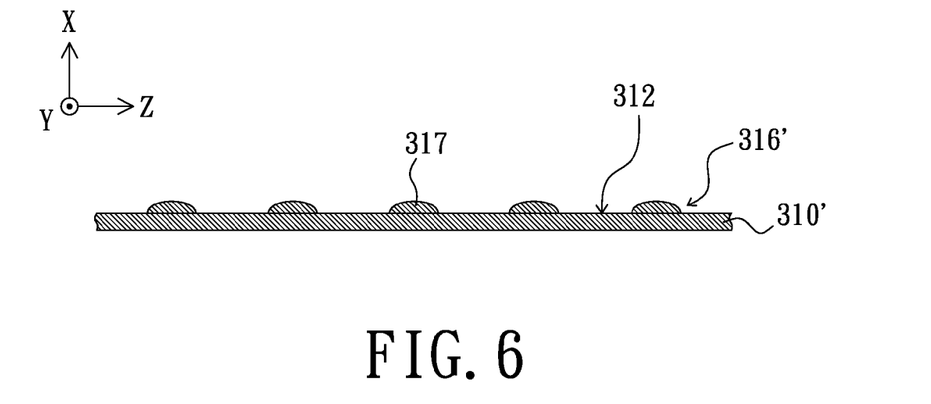
FIG. 6 is a schematic cross-section view of a back bezel of a liquid crystal display according to another embodiment of the present invention.

FIG. 6 is a schematic view of a back bezel of a liquid crystal display according to another embodiment of the present invention. Referring to FIG. 6, in another embodiment of the present invention, the protrusion unit 316' includes, for example, a plurality of protrusion bumps 317 arranged in the predetermined direction (e.g. the Z axis). The shape of the protrusion bumps in the present embodiment can be consisted of circular shape, elliptic shape, other shapes or the combination thereof. The shape of the protrusion bumps 317 is not limited to the above examples.

Figure 7:
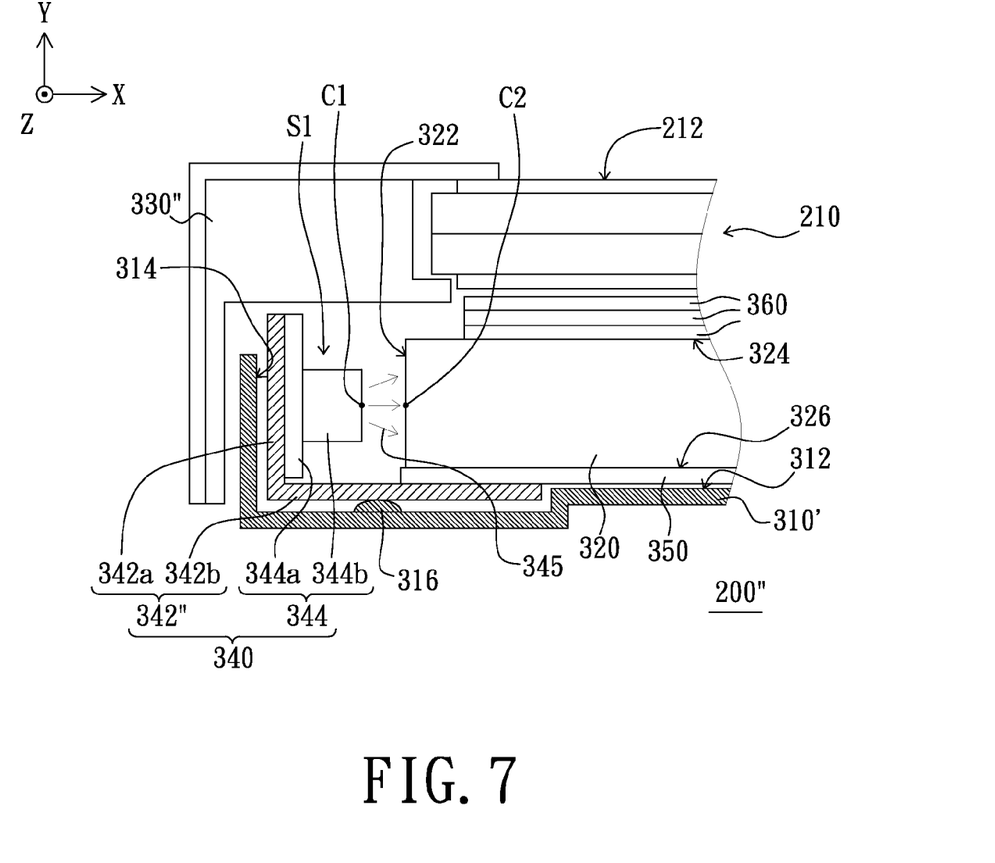
FIG. 7 is a schematic view of a liquid crystal display according to another embodiment of the present invention.

FIG. 7 is a schematic view of a liquid crystal display according to another embodiment of the present invention. Referring to FIG.7, the liquid crystal display 200" of the present embodiment is similar to the liquid crystal display 200', and only the difference will be described below. Comparing to the liquid crystal display 200', the frame 330" of the liquid crystal display 200" does not have the first securing portion and the lamp holder 342" of the light source unit 340" in the liquid crystal display 200" does not have the second securing portion.

Moreover, the back bezel 310' of the liquid crystal display 200" and the back bezel 310' of the liquid crystal display 200' are the same. In other words, the bottom 312 of the back bezel 310' of the liquid crystal display 200" has the protrusion unit 316 arranged in the predetermined direction (e.g. the Z axis) and the protrusion unit 316 is located in the accommodation space S1. When the light source unit 340" is mounted or attached into the accommodation space S1, the protrusion unit 316 supports the light source unit 340". More specifically, in the present embodiment, when the light source unit 340" is mounted or attached into the accommodation space S1, the protrusion unit 316 supports, for example, the first extending part 342b of the lamp holder 342" of the light source unit 340".

In the present embodiment, the protrusion unit 316 is used to support the light source unit 340", so this can keep each of the point light sources 344b in a proper height. More specifically, the central point C1 of the light emitting surface for each of the point light sources 344b can face the central line C2 of the light incident surface 322 for the light guide plate 320, wherein the central line C2 extends along the Z axis. Thus, display quality of the liquid crystal display 200" can be improved. Further, the protrusion unit 316 can be replaced by the protrusion 316' of FIG. 6.

In summary, the present invention at least has following advantages:

1. In the liquid crystal display of the present invention, the light source unit or the lamp detachable device is detachable, so it is convenient and time-saving to repair or replace the light source unit.

2. In an embodiment, the frame of the liquid crystal display has the first securing portion and the light source unit has the second securing portion. Employing the second securing portion to be jointed the first securing portion enables the light source unit to approach the light guide plate. This can avoid a larger interval between the light source unit and the light guide plate, and thus the light coupling efficiency of the liquid crystal display can be improved.

3. In another embodiment, due to the bottom of the back bezel having the protrusion units to support the light source unit, the light source unit can keep in the proper height to improve the display quality of the liquid crystal display.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A liquid crystal display comprising:
a back bezel;
a light guide plate disposed on a bottom of the back bezel, the light guide plate having a light incident surface opposite to a first side wall of the back bezel and spaced at a distance from the first side wall of the back bezel, there being an accommodation space between the first side wall of the back bezel and the light incident surface of the light guide plate, and the accommodation space having an upper side opposite to the bottom of the back bezel and an entrance side;
a liquid crystal display panel disposed above a light emitting surface of the light guide plate;
a frame assembled with the back bezel to fix and surround the light guide plate and the liquid crystal display panel, a portion of the frame extending across the upper side of the accommodation space to contact the liquid crystal display panel, a portion of a second side wall of the frame being opposite to the entrance side and the portion of the second side wall of the frame having a first securing portion; and
a light source unit located at the accommodation space and having a second securing portion, wherein when the light source unit is mounted into the accommodation space along a predetermined direction from the entrance side, the second securing portion is jointed the first securing portion to fix the light source unit.

2. The liquid crystal display as claimed in claim 1, wherein the first securing portion comprises a securing recess, the second securing portion comprises a securing pin, and when the light source unit is mounted into the accommodation space, the second securing portion is wedged with the first securing portion.

3. The liquid crystal display as claimed in claim 2, wherein the first securing portion further comprises a guiding portion adjoining an opening of the securing recess.

4. The liquid crystal display as claimed in claim 1, wherein the light source unit comprises:
a lamp holder having a plate with the second securing portion; and
a light source set disposed at the plate of the lamp holder.

5. The liquid crystal display as claimed in claim 4, wherein the light source set comprises:
a strip substrate disposed at the plate of the lamp holder; and
a plurality of point light sources disposed at the strip substrate.

6. The liquid crystal display as claimed in claim 5, wherein the point light sources are light emitting diodes.

7. The liquid crystal display as claimed in claim 4, wherein the lamp holder further comprises a first extending part which connects to the plate and is partially beneath the light guide plate when the light source unit is mounted into the accommodation space.

8. The liquid crystal display as claimed in claim 4, wherein the bottom of the back bezel has a protrusion unit located in the accommodation space and arranged in the predetermined direction, when the light source unit is mounted into the accommodation space, the protrusion unit supports the lamp holder.

9. The liquid crystal display as claimed in claim 8, wherein the protrusion unit comprises a plurality of protrusion bumps arranged in the predetermined direction.

10. The liquid crystal display as claimed in claim 8, wherein the protrusion unit comprises a protrusion strip arranged in the predetermined direction.

11. The liquid crystal display as claimed in claim 1, wherein the bottom of the back bezel has a protrusion unit located in the accommodation space and arranged in the predetermined direction, when the light source unit is mounted into the accommodation space, the protrusion unit supports the light source unit.

12. The liquid crystal display as claimed in claim 11, wherein the protrusion unit comprises a plurality of protrusion bumps arranged in the predetermined direction.

13. A liquid crystal display comprising:
a back bezel having a bottom;
a light guide plate disposed on a bottom of the back bezel, the light guide plate having a light incident surface opposite to the first side wall of the back bezel and spaced at a distance from a first side wall of the back bezel, there being an accommodation space between the first side wall of the back bezel and the light incident surface of the light guide plate, and the accommodation space having an upper side opposite to the bottom of the back bezel and an entrance side;
a liquid crystal display panel disposed above a light emitting surface of the light guide plate;
a frame assembled with the back bezel to fix and surround the light guide plate and the liquid crystal display panel, a portion of the frame extending across the upper side of the accommodation space to contact the liquid crystal display panel, a portion of a second side wall of the frame being opposite to the entrance side and the portion of the second side wall of the frame having a first securing portion; and
a lamp detachable device located in the accommodation space, and having a lamp holder and a second securing portion located at a side of the lamp holder; and
a light source set disposed at the lamp detachable device, wherein when the light source set and the lamp detachable device attached to the accommodation space, the lamp holder is attached into the accommodation space along a predetermined direction from the entrance side and the second securing portion is jointed the first securing portion to position the light source set.

14. The liquid crystal display as claimed in claim 13, wherein the lamp holder comprises a plate and a first extending part which connects to the plate and is partially beneath the light guide plate when the lamp detachable device is attached into the accommodation space.

15. The liquid crystal display as claimed in claim 13, wherein the light source set comprises:
a strip substrate fixed to the lamp holder; and
a plurality of point light sources disposed at the strip substrate.

16. The liquid crystal display as claimed in claim 15, wherein the point light sources are light emitting diodes.

17. The liquid crystal display as claimed in claim 13, wherein the bottom of the back bezel has a protrusion unit located in the accommodation space and arranged in the predetermined direction, when the light source unit is attached into the accommodation space, the protrusion unit supports the lamp holder.

18. The liquid crystal display as claimed in claim 17 wherein the protrusion unit comprises a plurality of protrusion bumps arranged in the predetermined direction.

19. The liquid crystal display as claimed in claim 17, wherein the protrusion unit comprises a protrusion strip arranged in the predetermined direction.

20. A liquid crystal display comprising:
a back bezel having a bottom, wherein the bottom has a protrusion unit arranged in a predetermined direction;
a light guide plate disposed on the bottom of the back bezel, the light guide plate having a light incident surface opposite to a first side wall of the back bezel and spaced at a distance from a first side wall of the back bezel, there being an accommodation space between the first side wall of the back bezel and the light incident surface of the light guide plate, and the protrusion unit being located in the accommodation space;
a liquid crystal display panel disposed above a light emitting surface of the light guide plate;
a frame assembled with the back bezel to fix and surround the light guide plate and the liquid crystal display panel, and a portion of the frame extending across an upper side of the accommodation space to contact the liquid crystal display panel; and
a light source unit located in the accommodation space, wherein when the light source unit is mounted into the accommodation space along the predetermined direction, there is an air gap between the light source unit and the bottom of the back bezel except the protrusion unit.

21. The liquid crystal display as claimed in claim 20 wherein the protrusion unit comprises a plurality of protrusion bumps arranged in the predetermined direction.

22. The liquid crystal display as claimed in claim 20, wherein the protrusion unit comprises a protrusion strip arranged in the predetermined direction.

23. The liquid crystal display as claimed in claim 20, wherein the light source unit comprises:
a lamp holder having a plate; and
a light source set disposed at the plate of the lamp holder.

24. The liquid crystal display as claimed in claim 23, wherein the lamp holder further comprises a first extending part which connects to the plate and is partially beneath the light guide plate when the light source unit is mounted into the accommodation space.

* * * * *